United States Patent [19]
Pergament

[11] 3,782,439
[45] Jan. 1, 1974

[54] ANTI-SKID TRACTION DEVICES

[76] Inventor: Henry Pergament, Hawley Rd., North Salem, N.Y. 10560

[22] Filed: Feb. 25, 1972

[21] Appl. No.: 229,417

Related U.S. Application Data

[63] Continuation-in-part of Ser. No. 215,536, Jan. 5, 1972 abandoned.

[52] U.S. Cl............................... 152/218, 152/225
[51] Int. Cl.... B60c 27/04, B60c 27/10, B60c 27/20
[58] Field of Search.................. 152/225, 226, 227, 152/228, 318, 218

[56] References Cited
UNITED STATES PATENTS

| | | | |
|---|---|---|---|
| 2,717,019 | 9/1955 | Baldwin | 152/226 |
| 2,456,544 | 12/1948 | Varner | 152/225 |
| 1,769,307 | 7/1930 | Price | 152/225 |
| 2,429,738 | 10/1947 | Zimmer | 152/225 |
| 2,510,451 | 6/1950 | Williams et al. | 152/225 |
| 2,837,133 | 6/1958 | Armenante et al. | 152/228 X |
| 2,436,549 | 2/1948 | Boyer | 152/218 |

*Primary Examiner*—Gerald M. Forlenza
*Assistant Examiner*—Howard Beltran
*Attorney*—Nelson Littell et al.

[57] ABSTRACT

An anti-skid traction device for mounting on the weeel of a vehicle comprises a triangular frame having means at two apices thereof for gripping the wheel, a slidable rod contained in one hollow arm of the frame, this rod having means adjacent the third apex for gripping the wheel, and resilient means for moving the rod into the hollow arm to securely grip the wheel.

7 Claims, 5 Drawing Figures

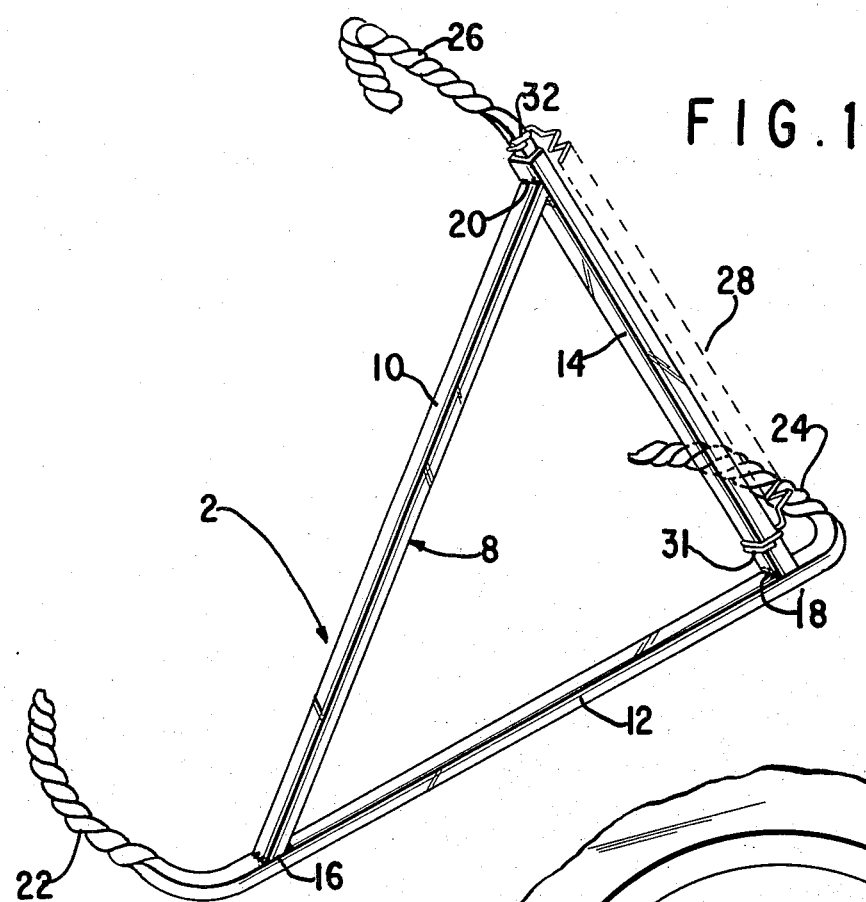
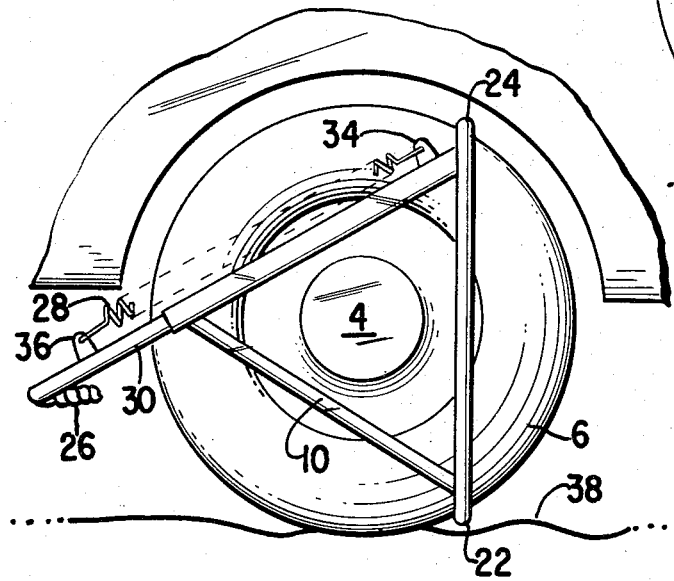
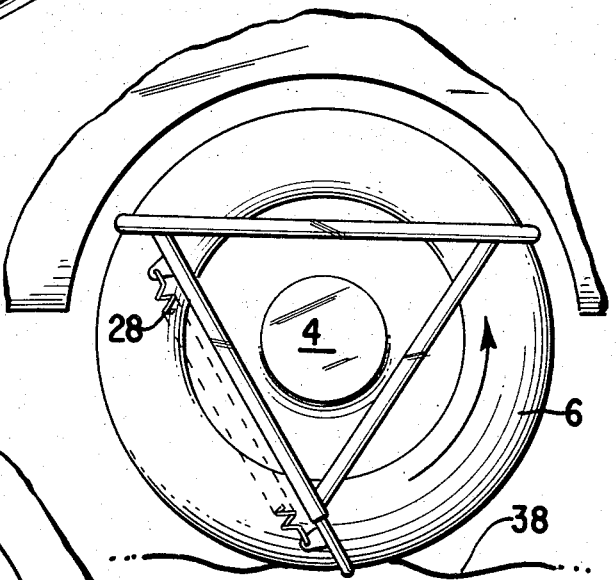

ANTI-SKID TRACTION DEVICES

CROSS REFERENCE TO RELATED APPLICATION

This is a continuation-in-part of my copending application Ser. No. 215,536 filed Jan. 5, 1972, and now abandoned.

BACKGROUND OF THE INVENTION

This invention relates to anit-skid devices of the type for use in connection with vehicle wheels.

In the prior art relating to structures of this general nature, there have been numerous devices adapted for attachment to vehicle wheels to provide traction in snow or mud or on icy surfaces. However, these structures have not been particularly easy to mount on the wheels until the wheels were raised off the ground; nor have these structures been readily adjustable to the variations in wheel size. In U. S. Pat. No. 2,456,544 to Varner it is known to provide a locking device for a telescoping tire clamp member, in which the locking device comprises a lever link to engage a bayonet slot when activated by the lever bar movable in a plane transverse to the plane of the tire. This prevents any further movement of the member until it is unlocked by the lever bar, Thus no adjustment can occur. Also, in U. S. Pat. No. 2,510,451 to Williams et al. it is known to provide a locking device comprising in part a lever mechanism also transverse to the plane of the tire which further includes a connecting member for adjusting the length of the wheel gripping arm. However, this adjustment feature may permit the loosening of the gripping arm under certain circumstances where the tire becomes deflated due to a slow air leak or because of a puncture producing a more rapid air leak. Thus no adjustment can occur while the vehicle is in motion.

OBJECTS OF THE INVENTION

It is therefore an object of the present invention to provide an anit-skid device for a vehicle tire that is self-adjusting and self-locking while the vehicle is in motion to prevent loosening of its effective grip upon the wheel if the wheel becomes deflated.

It is another object of the present invention to provide an anit-skid device for a vehicle tire that has a self-adjusting and self-locking feature capable of being readily replaced.

It is a further object of the present invention to provide an anti-skid device comprising a body member having at least one stationary arm; said arm comprising a hollow shaft housing a slidably telescoping rod member for gripping the wheel of a vehicle; and means attached to said arm for moving the rod member in the direction of securely gripping said wheel; said anti-skid device thereby being self-adjusting, self-tightening and self-locking unidirectionally in the direction of securely gripping the wheel.

Other and further objects of the present invention will become apparent as the description thereof proceeds.

DESCRIPTION OF THE INVENTION

In copending application S.N. 175,817 filed Aug. 30, 1971, the invention is directed to providing an anti-skid device comprising a slidably telescoping rod member having a first series of teeth over its length and housed in a first arm in combination with a locking assembly on said first arm comprising a trigger means having a second series of teeth for meshing into the first series of teeth to prevent movement of the rod member in the extension direction out of the first arm while simultaneously permitting movement of the rod member in the compression direction to securely grip the wheel.

It has been found that the cost of cutting, filing, and polishing these two series of teeth is quite expensive to the extent that the finished anti-skid device tends to have a price disadvantage.

It has also been found that if the locking assembly were to become damaged that the entire anit-skid device would necessarily have to be replaced. In the present invention the means for moving the rod member is readily replaceable if it should become damaged or worn out.

It has been found that these problems are effectively overcome by the present invention which is directed to an anti-skid device comprising a body member having at least one stationary arm; said arm comprising a hollow shaft housing a slidably telescoping rod member for gripping the wheel of a vehicle; and means attached to said arm for moving the rod member in the direction of securely gripping said wheel; said anti-skid device thereby being self-adjusting, self-tightening and self-locking unidirectionally in the direction of securely gripping the wheel.

FIG. 1 is a perspective view of the anti-skid device,

FIG. 2 is a view of the anti-skid device having been expanded and placed on a tire, FIG. 3 is a view of the anit-skid device being tightened by rotation of a tire.

Figure 4:
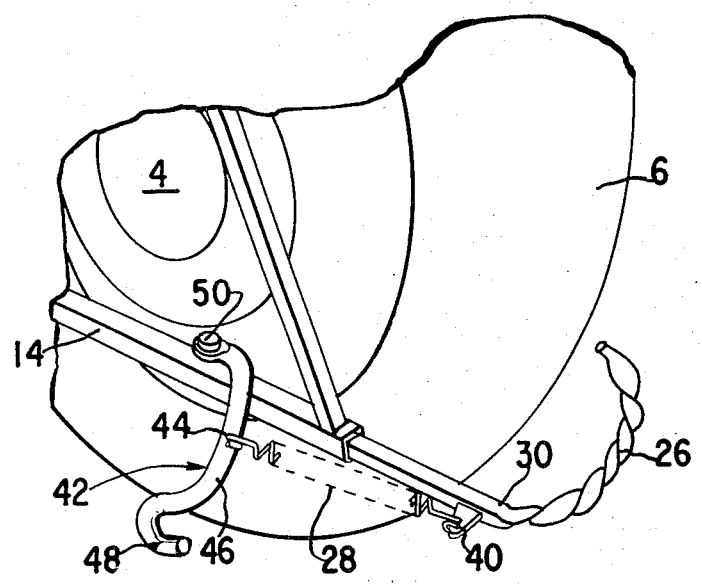
FIG. 4 is a view of another embodiment of the anti-skid device having been explained and placed on a tire.

Referring now to the several views of the drawings, the invention will be explained in detail.

In FIG. 1 general reference numeral 2 indicates an anti-skid device shown in FIGS. 2 and 3 as mounted on a conventional automobile wheel 4 carrying a conventional pneumatic tire 6. A device of this nature is applied to the drive wheels, generally the rear wheels of an automobile, when the vehicle must travel through deep snow, soft mud, or on icy surfaces, and is intended to give suitable traction to the wheels when traveling is difficult.

Anti-skid device 2 comprises a body member 8 having three rigid stationary metal arms 10, 12 and 14 made of steel, for example, in a plane parallel to the plane of the wheel. These three arms are connected to form an equilateral triangle frame, for example, by being welded to each other only at the vertices thereof at points 16, 18 and 20. Each arm may project a short distance past the vertex, whereupon an extension means 22, 24 or 26 is attached thereto, either by welding or by being a further extension of its respective arm. The extension means on each arm is curved to fit around the width or rolling surface of the wheel and tire and have a straight central area, plus being of a twisted outer surface not only to grip the wheel but also to provide tractional friction with the ground.

Mounted upon arm 14 is the means 28 for moving a telescoping rod member 30 in the direction of securely gripping the wheel 4, as shown by FIG. 2. Means 28 is shown to be a spring means but alternatively could be any elastic member that has the power to pull rod member 30 into its housing in arm 14 and to maintain the extension means of the rod member in a firm grip around the tire.

Spring 28 is attached to the stationary housing arm 14 by fastener means 31 or 34 adjacent to vertex 18 and slightly thereabove, while the spring is simultaneously attached to the telescoping rod member by fastener means 32 or 36 adjacent to the extension means 26. In the embodiment shown in FIG. 1 the fastener means 31 is comprised by a hole drilled through arm 14, through which a straightened portion of one end of the spring has been extended; and then the straightened portion is wrapped around the arm. Rod 30 is not so lengthy as to contact this straightened portion of spring 28 even when fully inserted into arm 14. Fastener means 32 is comprised by a hole drilled through rod member 30 (FIG. 2 shows rod 30) through which a straightened portion of the other end of the spring has been extended; and then the straightened portion is wrapped around the rod. In the embodiment shown in FIG. 2 the fastener means 34 is comprised by a hook attached, for example, by being welded or screwed to the stationary housing arm 14 adjacent to vertex 18 for holding one end of the spring which is usually wrapped into the eye of the hook. Fastener means 36 is comprised by a hook attached to the telescoping rod member 30 adjacent to the extension means 26 for holding one end of the spring which is usually wrapped into the eye of the hook.

One advantage of the present invention is that if the elastic member 28 should become damaged or worn out then this elastic member can readily be removed and replaced. In order to insure ease of replaceability of the spring, the two embodiments of fastener means are constructed and arranged such that each respective end of the elastic member is securely affixed into position on the anti-skid device without being permanently attached thereto.

In the operation of this anti-skid device, the operator would grasp arm 12 with one hand and grasp extension means 26 with the other and using means 26 as a handle pull the telescoping rod member 30 out of its housing 14, thus stretching the spring. Then extension mmeans 22 and 24 would then be positioned around the tire 6 with the body member 8 pressed snugly against the wheel 4, as shown by FIG. 2. At this point the operator would allow the extended spring to draw the rod member 30 back into its housing, whereby extension means 26 would snugly and firmly grip the tire.

This arrangement of features prevents movement of the telescoping rod member in a direction that extends it out of the housing, whereby the anti-skid device could not properly grip the wheel. However, this arrangement of features simultaneously permits movement of the rod member in a direction that compresses it into the housing, so as to assure very adequate grippage of the wheel.

If, for example, the tire were to lose air pressure while the car is parked and thereby become of diminished diameter, the anti-skid device would automatically adjust itself to this new diameter based upon the elastic pull of the spring means 28. If the tire were to lose air pressure while the car were in motion and thereby become of diminished diameter, the anti-skid device would automatically adjust itself to this new diameter based upon the rolling motion of the vehicle which would position the extension 26 between the wheel and ground 38 and be means of the weight of the vehicle force the rod 30 further into its housing until a tight grip of the wheel were again achieved as shown in FIG. 3. This tight grip would be maintained by elastic member 28. Thus the anti-skid device is self-adjusting, self-tightening for safety purposes, and self-locking unidirectionally for telescoping movement of the rod member in the direction of securely gripping the tire and the wheel even if the tire were to become deflated while the vehicle is at rest or in motion.

Figure 5:
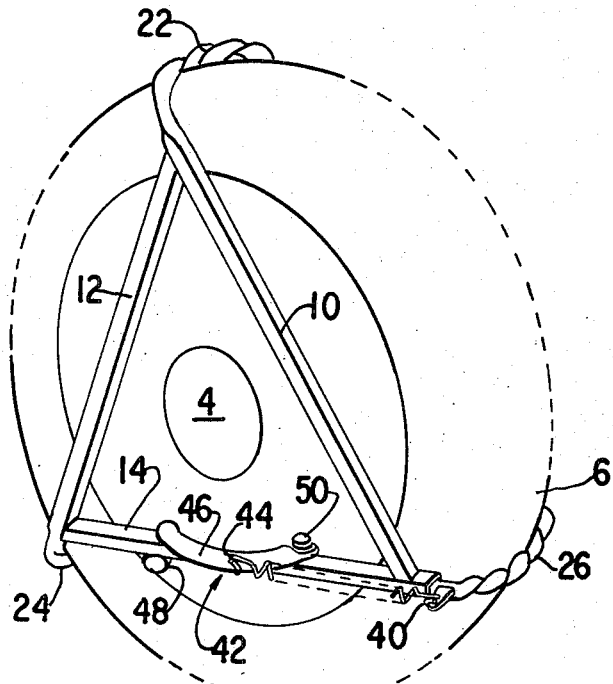
FIG. 5 is a view of another embodiment of the anti-skid device tightened onto a tire.

In FIGS. 4 and 5 a second embodiment of the invention is shown.

Mounted upon arm 14 is the means 28 for moving a telescoping rod member 30 in the direction of securely gripping the wheel 4, as shown by FIG. 4. Means 28 is shown to be a spring means but alternatively could be any elastic member that has the power to pull rod member 30 into its housing in arm 14 and to maintain the extension means of the rod member in a firm grip around the tire.

Spring 28 is attached to telescoping rod member 30 by fastener means 40 adjacent to the extension means 26. In the embodiment shown in FIG. 4 the fastener means 40 is comprised by a hole drilled through rod 30, through which a straightened portion of one end of the spring has been extended; and then the straightened portion is looped around the arm. Fastener means 40 is not so positioned as to contact the tire when the rod member is fully inserted into the arm 14 so as to have the extension means grip the tire. Spring 28 is attached at the other end to lever means 42 that has a hole 44 drilled through the central portion thereof, into which one end of spring 28 is placed. The lever comprises a bar 46 having a grapple means 48 at one end thereof, while at the opposite end thereof having a pivot means 50 for rotatably fastening the lever means to the hollow arm 14.

Preferably the lever means comprises a C-shaped bar 46 in which the grapple means 48 is an L-shaped bar integrally joined to the end of the C-shaped bar in such a manner that the lever means can securely grip the hollow arm and be locked thereto, as shown in FIG. 5. While the L-shaped grapple means is shown opening away from arm 14, it could also open toward arm 14 as long as it enables the lever means to securely grip arm 14.

The pivot means 50 comprises a pin rigidly attached at one end to arm 14, for example, by welding. The pivot pin is loosely attached to the other end of the C-shaped bar. Even though the C-shaped bar can rotate and wobble around the pivot pin, bar 44 cannot escape from this pin because the flattened head portion of the pin prevents this from occurring.

One advantage of the present invention is that if the elastic member 28 should become damaged or worn out then this elastic member can readily be removed and replaced. In order to insure ease of replaceability of the spring, the fastener means 40 and 44 are constructed and arranged such that each respective end of the elastic member is securely affixed into position on the anti-skid device without being permanently attached thereto.

In the operation of this embodiment of the anti-skid device and assuming one begins with the lever means in its locked position shown in FIG. 5, the operator would first push the lever bar toward tire 4 until grapple means 48 is disengaged from hollow arm 14. Then with a lifting and rotating movement of the lever bar 46, the operator would raise grapple means 48 up and over arm 14 until the lever means 42 were in the position shown in FIG. 4. At this point the tension in spring 28 would be released. The operator would grasp arm 12 with one hand and grasp extension means 26 with the other and using means 26 as a handle pull the telescoping rod member 30 out of its housing 14, thus stretching the spring. Then extension means 22 and 24 would then be positioned around the tire 6 with the body member 8 pressed snugly against the wheel 4, as shown by FIG. 5. At this point the operator would push extension means 26 against the tire forcing the rod member 30 back into its housing. Lever means 42 would be rotated and lifted so as to raise grapple means 48 over arm 14 and position it between arm 14 and tire 6. Then the grapple means 48 would be pressed against arm 14 in order that the lever will securely grip the hollow arm and be locked thereto.

This arrangement of features prevents movement of the telescoping rod member in a direction that extends it out of the housing, whereby the anti-skid device could not properly grip the wheel. However, this arrangement of features simultaneously permits movement of the rod member in a direction that compresses it into the housing, so as to assure very adequate grippage of the wheel.

If, for example, the tire were to lose air pressure while the car is parked and thereby become of diminished diameter, the anti-skid device would automatically adjust itself to this new diameter based upon the elastic pull of the spring means 28. If the tire were to lose air pressure while the car were in motion and thereby become of diminished diameter, the anti-skid device would automatically adjust itself to this new diameter based upon the rolling motion of the vehicle which would position the extension 26 between the wheel and ground 38 and by means of the weight of the vehicle force the rod 30 further into its housing until a tight grip of the wheel were again achieved as shown in FIG. 3. This tight grip would be maintained by elastic member 28. Thus the anti-skid device is self-adjusting, self-tightening for safety purposes, and self-locking unidirectionally for telescoping movement of the rod member in the direction of securely gripping the tire and the wheel even if the tire were to become deflated while the vehicle is at rest or in motion.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. A self-adjusting and self-tightening anti-skid device for mounting on a driving wheel of a motor vehicle, consisting of a unitary triangular frame composed of two solid rod members and one hollow rod member, first and second means for gripping said wheel at two apices of said triangular frame, a solid rod member with a third means for gripping the wheel telescopically slidable within said hollow rod member, each of said wheel gripping means being an integral planar extension of a respective solid rod member and extending at substantially right angles to the plane of said triangular frame, and exterior spring means for resiliently urging said slidable solid rod member into said hollow rod member.

2. The anti-skid device of claim 1 in which said spring means is attached directly to said hollow rod member and directly to said slidable rod member.

3. The anti-skid device of claim 2 wherein a straightened portion of said spring means extends through a hole in the hollow rod member adjacent to a vertex of said frame and wrapped around said hollow rod member; and wherein another straightened portion of said spring means extends through a hole in said slidable rod member adjacent to the gripping means and wrapped around said slidable rod member.

4. The anti-skid device of claim 2 wherein a first hook is attached to the hollow rod member adjacent a vertex of said frame for holding one end of said spring means; and wherein a second hook is attached to said slidable rod member adjacent to the gripping means for holding the other end of said spring means.

5. The anti-skid device of claim 1 in which said spring means is attached to a lever means.

6. The anti-skid device of claim 5 in which said lever means comprises a bar having a grapple means at one end thereof, at the opposite end thereof said bar having a pivot means for rotatably fastening said lever means to said hollow rod member, and said bar having means for attaching said spring means thereto.

7. The anti-skid device of claim 6 in which said lever means comprises a C-shaped bar; in which said grapple means comprises an L-shaped bar integrally joined to said C-shaped bar so as to permit said lever to securely grip said hollow rod member and to lock said lever means thereto; in which said pivot means comprises a pin rigidly attached at one end to said hollow rod and loosely attached to the other end of said C-shaped bar; and in which said means for attaching said spring means is an opening through the central portion of said lever means.

* * * * *